United States Patent Office 3,016,391
Patented Jan. 9, 1962

---

3,016,391
2,3,4,17-TETRAACETOXYESTRA-1,3,5(10)-TRIENE
James Jiu, Morton Grove, Ill., assignor to G. D. Searle & Co., Chicago, Ill., a corporation of Delaware
No Drawing. Filed Feb. 20, 1961, Ser. No. 90,217
3 Claims. (Cl. 260—397.5)

This invention relates to the 2,3,4,17-tetraacetoxy derivatives of 1,3,5(10)-estratriene. Because the possibility of asymmetry exists at the carbon atom in the 17 position, two isomers of this compound are possible. The compounds of this invention can be represented by the following formula

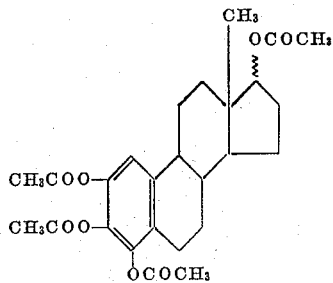

wherein the 17-substituent is α or β.

The compounds of this invention are useful because of their valuable pharmacological properties. They have, for example, the capacity to decrease the serum concentration of cholesterol and the corresponding cholesterol/phospholipid ratio. They are also estrogens and antianabolic agents.

To prepare the compounds of this invention, a suspension of 17β-estradiol in glacial acetic acid is reacted with lead tetraacetate to give the 4,4-diacetoxy-17-hydroxyestra-1,5(10)-dien-3-one. This is mixed with acetic anhydride in the presence of a trace of sulfuric acid to give the corresponding 2,3,4,17-tetraacetoxyestra-1,3,5(10)-triene.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

*4,4-diacetoxy-17β-hydroxyestra-1,5(10)-dien-3-one.*—To a suspension of 25 parts of 17β-estradiol in 500 parts of glacial acetic acid at 25–35° C. is added, portionwise over a 10-minute period with agitation, 101 parts of lead tetraacetate. Agitation in the specified temperature range is continued for an additional 20 minutes, at which point the reaction mixture is dumped into ice water. The resultant mixture, in turn, is extracted with benzene; and the benzene extract is dried over anhydrous sodium sulfate. Evaporation of solvent under reduced pressures leaves a residue which is purified by chromatography on magnesium silicate, using benzene and ethyl acetate as developing solvents. In an eluate comprising 1 part of ethyl acetate for each 19 parts of benzene there is obtained, on evaporation of solvent, a residue which, recrystallized from ethyl acetate, melts at 184–188° C. This material is 4,4-diacetoxy-17β-hydroxyestra-1,5(10)-dien-3-one of the formula

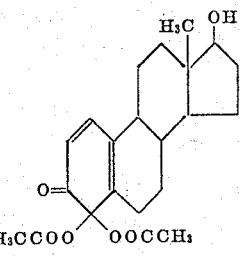

Example 2

*2,3,4,17β - tetraacetoxyestra - 1,3,5(10) - triene.*—To a suspension of 1.7 parts of 4,4-diacetoxy-17β-hydroxyestra-1,5(10)-dien-3-one in 8.6 parts of acetic anhydride is added several drops of concentrated sulfuric acid. The reaction mixture is allowed to stand at room temperature for 2 hours with intermittent swirling. After pouring the mixture onto cracked ice and water, dilute sodium bicarbonate solution is added. The resultant mixture is extracted with benzene and the combined benzene extracts are washed with water, dried over anhydrous sodium sulfate and evaporated to dryness under reduced pressure. The residue is chromatographed on silica gel using ethyl acetate and benzene as developing solvents. By eluting with 2 to 5% ethyl acetate in benzene (v./v.), there is obtained 2,3,4,17β - tetraacetoxyestra - 1,3,5(10) - triene which melts at about 185–187° C. after recrystallization from methanol. This compound has the following formula

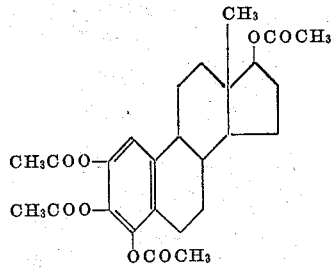

Example 3

*2,3,4,17α - tetraacetoxyestra - 1,3,5(10) - triene.*—To a solution of 1.4 parts of the mother liquor from the recrystallization of 4,4-diacetoxy-17β - hydroxyestra - 1,5(10)-dien-3-one in Example 1 in 5.4 parts of acetic anhydride is added a few drops of concentrated sulfuric acid. The reaction mixture is allowed to stand at room temperature for 2 hours with intermittent swirling. After pouring the mixture into cracked ice and water, it is made alkaline with dilute sodium bicarbonate solution. The resultant mixture is extracted with several portions of benzene and the combined benzene extracts are washed with water, dried over anhydrous sodium sulfate and evaporated to dryness under reduced pressure. The residue is chromatographed on silica gel using benzene and ethyl acetate as developing solvents. From an eluate consisting of from 1:19 to 1:9 parts of ethyl acetate to parts of benzene by volume, there is obtained, after evaporation of the solvent and recrystallization of the product from methanol, 2,3,4,17α - tetraacetoxyestra-1,3,5(10) - triene melting at about 210–216° C. The product has the formula
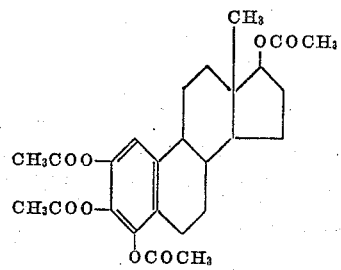
What is claimed is:
1. A compound of the formula
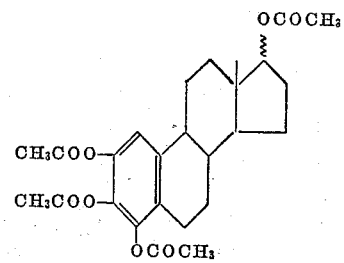
2. 2,3,4,17α-tetraacetoxyestra-1,3,5(10)-triene.
3. 2,3,4,17β-tetraaectoxyestra-1,3,5(10)-triene.
No references cited.